UNITED STATES PATENT OFFICE.

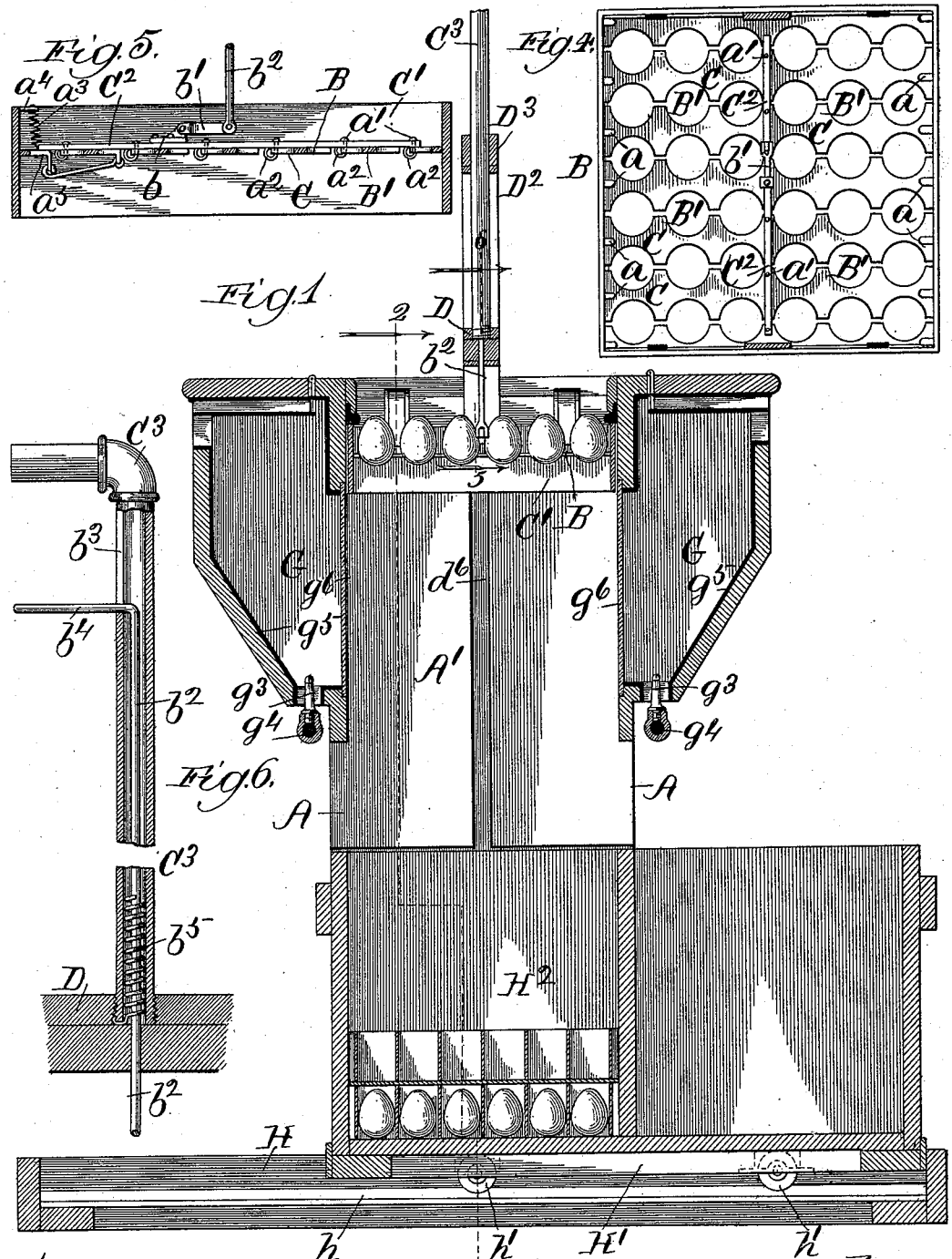

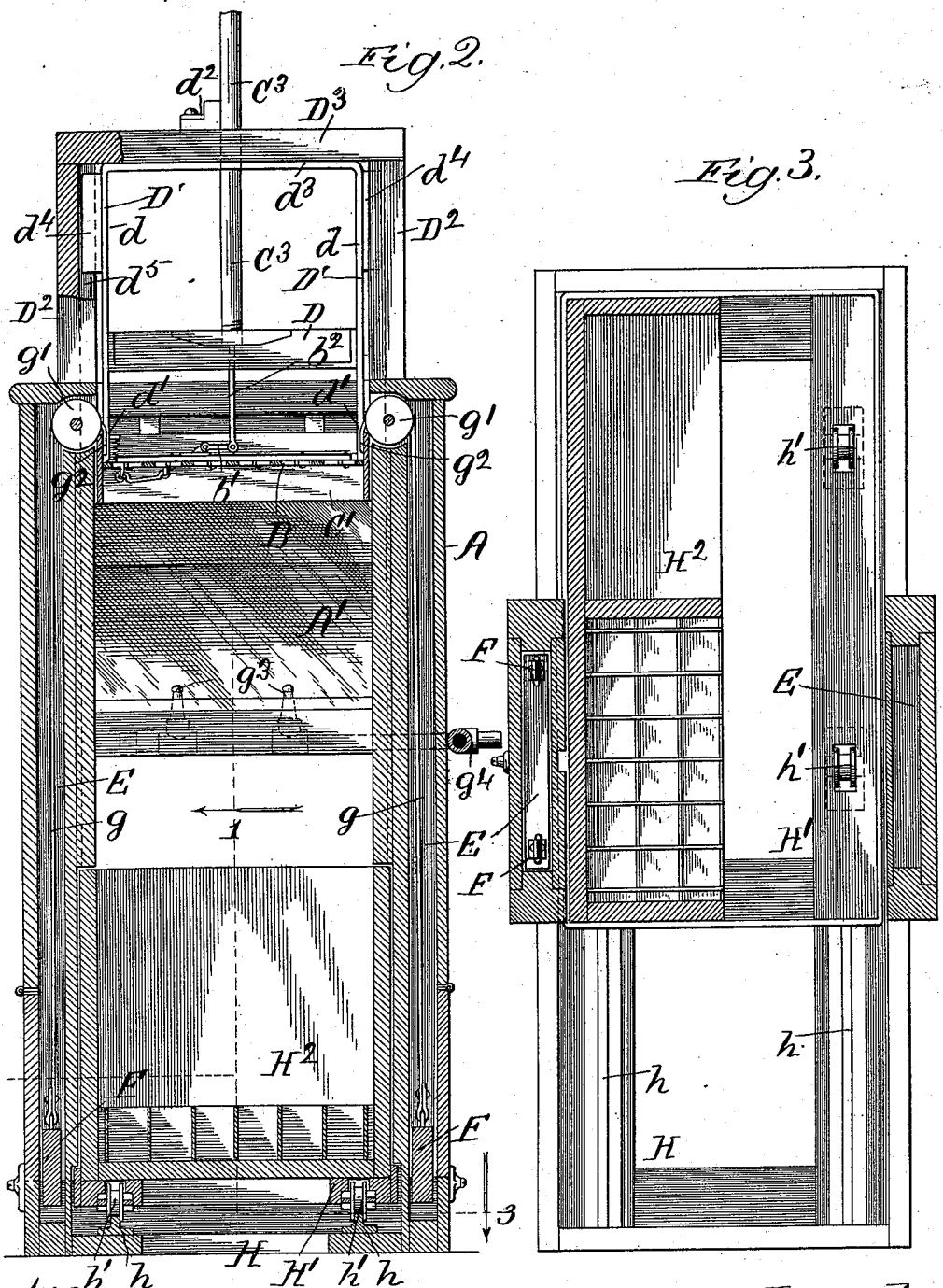

JOHN SCHNEBERGER AND VACLAV KOTVA, OF CHICAGO, ILLINOIS.

EGG-TESTER.

SPECIFICATION forming part of Letters Patent No. 569,941, dated October 20, 1896.

Application filed December 30, 1895. Serial No. 573,781. (No model.)

*To all whom it may concern:*

Be it known that we, JOHN SCHNEBERGER and VACLAV KOTVA, citizens of the United States, residing at Chicago, in the county of Cook and State of Illinois, have invented certain new and useful Improvements in Egg-Testing Apparatus; and we do hereby declare the following to be a full, clear, and exact description of the invention, such as will enable others skilled in the art to which it appertains to make and use the same.

The object of this invention is to provide an improved apparatus for testing or inspecting eggs, the same consisting of certain novel features in the construction and operation, as will be hereinafter set forth.

Figure 1 is a vertical section on line 1, Fig. 2, looking in the direction indicated by the arrow; Fig. 2, a vertical section on angular line 2, Fig. 1; Fig. 3, a horizontal section on angular line 3, Fig. 2; Fig. 4, a plan of the testing-tray; Fig. 5, a section on line 5, Fig. 1; and Fig. 6, a broken-away section and part elevation on line 6, Fig. 1.

A represents a box-receptacle, in which is located the testing-chamber A'. A testing-tray B is adapted to have a vertical movement in the receptacle A. This tray is capable of holding thirty-six eggs, being apertured for that number. The apertures B' are of a less diameter than that of an egg, so that the same will be retained therein without passing through when the tray is in its normal position, as illustrated in Fig. 1.

The testing-tray is composed of a number of slats C, the respective ends of which are mounted on pivot-bearings $a$, Fig. 4, fixed in opposite sides of the inclosing box-frame C'. This provides for a rocking movement of the series of slats in discharging the eggs after the same are tested. The slats are connected by a bar $C^2$, loosely attached thereto by means of a number of fasteners $a'$, Fig. 5, which are headed on the upper side and terminate in curved or hook ends $a^2$ on the under side, so as to provide for the tilting movement of the slats.

A spring $a^3$ is connected at its upper end to a lug $a^4$, secured to the frame C', the lower end being connected to an angle-plate $a^5$, which is in turn secured to the under side of one of the edge slats.

The tension of spring $a^3$ serves to retain the slats in the normal horizontal position shown, but yields to allow the tilting or rocking of the slats in discharging the eggs.

A lug $b$ is secured to bar $C^2$ and has one end of a link $b'$ connected thereto. The opposite end of this link is connected to the lower end of a handle-rod $b^2$, Figs. 2 and 5, which runs up inside of a tubular handle $C^3$ to the slotted opening $b^3$ therein and is bent outwardly at right angles therethrough to form the handle end $b^4$, as shown in Fig. 6.

A spring $b^5$, coiled on rod $b^2$, serves to retain the same in its lower or normal position, (shown in Figs. 2 and 5,) the slats being in their corresponding normal position.

By pulling upwardly on the handle-rod $b^2$ the slats may be tilted far enough to discharge the eggs from the testing-tray.

The lower end of tubular handle $C^3$ is fixed in a cross-bar D, the respective ends of which are secured to the two vertical side members $d\ d$ of a guide-frame D'. The lower ends of members $d\ d$ are secured to the opposite inner sides of box-frame C', as at $d'$, Fig. 2.

The companion standards $D^2\ D^2$ are mounted on the top of the box-receptacle and are connected at the upper ends by a cross-bar $D^3$, which is apertured for the passage of the tubular handle $C^3$, the upper end of which is bent at right angles and adapted to have contact with the stop $d^2$ and limit the down movement thereof.

The top part $d^3$ of the guide-frame D', coming in contact with the under side of cross-bar $D^3$, limits the up movement of the tubular handle and the testing tray.

Guide-lugs $d^4\ d^4$ are attached to the outer sides of vertical members $d\ d$ of guide-frame D', which project into grooves $d^5$, Fig. 2, in companion standards $D^2$. The grooves $d^6$ in opposite sides of the box-receptacle, Fig. 1, are continuations of grooves $d^5$ for guiding the up-and-down movement of the testing-tray and connecting parts.

The box-receptacle is provided on opposite sides with passages E E, Figs. 2 and 3, which extend from top to bottom. These passages provide space for the vertical movement of companion counterweights F F, connected to the lower ends of cords $g$ $g$, which run over friction-rollers $g'$ $g'$ and connect with the frame of the testing-tray, as at $g^2$.

The compartments G G on opposite sides of the box-receptacle have burners $g^3$ extending therein, which furnish the necessary light, the gas being conducted through a pipe $g^4$. The reflecting-surfaces $g^5$ reflect the light into the space under the testing-tray through the panes of glass $g^6$ $g^6$, framed in the walls of the box-receptacle.

The supporting-base H of the receptacle is provided with track-rails $h$ $h$. A traveling platform H' has a number of track-rollers $h'$ journaled therein, and which are adapted to run on the track-rails. H² represents an egg-case placed on the traveling platform and moved into position to receive the eggs as they are tested. When one compartment of the case is filled, the other end is moved into position and also filled before removing the case from the platform.

In practice the testing-tray is filled from the top and the whole contents inspected at a glance downwardly. The tray is then lowered into the shipping-case by forcing down the tubular handle and the contents of the tray discharged by pulling up on the handle-rod $b^2$, which has the effect, through the connections described, of tilting or turning the egg-slats far enough edgewise to let the eggs pass through. When the handle-rod is released, the slats are automatically returned to their normal position by the means hereinbefore set forth.

The counterweights assist in returning the testing-tray to its uppermost position and holding the same there during the time it is being again filled.

The testing-tray is capable of holding thirty-six eggs, so that number is tested simultaneously and deposited in the shipping-case without rehandling, thus greatly facilitating the operation over that of holding the eggs in the hand during the process of candling.

Having thus described our invention, what we claim as new, and desire to secure by Letters Patent, is—

1. In an egg-testing apparatus, the combination with a box-receptacle, of a movable testing-tray, located in said receptacle, the tubular handle, the cross-bar, D, the guide-frame D', the companion standards, mounted on the box-receptacle and provided with grooves, the guide-lugs, attached to the guide-frame and extending into said grooves, and the counterweights, connected to the testing-tray, substantially as described.

2. In an egg-testing apparatus, the combination with a box-receptacle, of a testing-tray, movably supported therein and consisting of a number of apertured slats and a box-frame, in which the respective ends of the slats are pivoted so as to be turned edgewise, the connecting-bar, loosely attached to the slats, the lug, secured to said bar, the handle-rod, the link, joining said lug and handle-rod, the spring, connecting with and returning the slats to their normal position, the tubular handle, the cross-bar D, the guide-frame D', the companion standards, provided with grooves, the guide-lugs, attached to the guide-frame and extending into said grooves, and the counterweights, connected to and moving with the testing-tray, substantially as described.

In testimony whereof we affix our signatures in presence of two witnesses.

JOHN SCHNEBERGER.
VACLAV KOTVA.

Witnesses:
L. M. FREEMAN,
L. B. COUPLAND.